United States Patent [19]
Pippert et al.

[11] Patent Number: 5,499,826
[45] Date of Patent: Mar. 19, 1996

[54] ANTI-EXTRUSION LIP SEAL

[75] Inventors: Aaron J. Pippert, Houston; Frederick B. Pippert, Sugar Land, both of Tex.

[73] Assignee: Utex Industries, Inc., Houston, Tex.

[21] Appl. No.: 356,684

[22] Filed: Dec. 15, 1994

Related U.S. Application Data

[63] Continuation-in-part of Ser. No. 79,627, Jun. 18, 1993.
[51] Int. Cl.$^6$ .................... F16J 15/00; D04C 1/00
[52] U.S. Cl. ............ 277/188 A; 277/227; 277/230; 87/7
[58] Field of Search .............. 277/188 R, 188 A, 277/222, 205, 230, 152, 205, 227; 87/1, 5, 7

[56] References Cited

U.S. PATENT DOCUMENTS

| | | | |
|---|---|---|---|
| 3,719,366 | 3/1973 | Pippert | 277/205 |
| 4,219,204 | 8/1980 | Pippert | 277/188 A |
| 4,298,562 | 11/1981 | Latty | 264/103 |
| 4,310,163 | 1/1982 | Pippert | 277/188 A |
| 5,028,056 | 7/1991 | Bemis et al. | 277/227 |

*Primary Examiner*—Daniel G. DePumpo
*Attorney, Agent, or Firm*—Browning, Bushman, Anderson & Brookhart

[57] ABSTRACT

An anti-extrusion lip seal device is disclosed for use that includes a flexible sealing lip portion supported by an annular braided anti-extrusion element. The braided anti-extrusion element is less resilient than the sealing lip portion to resist extrusion forces acting on the seal device. The braided anti-extrusion element includes fibers that are interconnected both laterally and radially. It is further impregnated with elastomeric or resinous material. Resiliency of the braided element may be adjusted during manufacture by varying the tightness of the braid as well as by variation of the resiliency of the impregnated material.

9 Claims, 3 Drawing Sheets

ANTI-EXTRUSION LIP SEAL

BACKGROUND OF THE INVENTION

This application is a continuation-in-part of U.S. application Ser. No. 08/079,627, filed Jun. 18, 1993.

1. Field of the Invention

The present invention relates generally to anti-extrusion lip seals and, more particularly, to a unique, lip seal assembly including a braided construction anti-extrusion section.

2. Description of the Background

In the past, various methods have been used to form fibrous anti-extrusion elements molded into flexible sealing devices. Typical uses for seal designs of this type include oil field mud pump applications such as mud pump pistons. Oil field mud pumps often operate at high pressures and are used to circulate drilling fluids through the well bore. Lip seals employed to seal around such pistons are thus subject to significant stresses including reversal of pressure. The resiliency of the lip seal enhances sealing with the cylinder liner during the pressure stroke. However, the same resiliency that promotes sealing also subjects the lip seal to extrusion that may inhibit sealing and may also damage the lip seal. The use of a fibrous reinforcement section restricts lip seal flexibility to avoid extrusion while still permitting the lip seal sufficient resiliency for good sealing. Reliability of such seals is often an important concern. In the case of the mud pump piston, for instance, circulation of the drilling fluids or drilling slurry is essential to drilling operations.

An example of a fiber composite sealing element may be seen in U.S. Pat. No. 5,028,056 to Bemis et at., which shows an elastomeric sealing lip portion and a base portion chemically bonded to the sealing lip. Such a seal may include laminated portions or a rolled portion at the heel of the sealing element.

Sealing elements that have a reinforced base portion formed of resilient material, have been found to fail most frequently in the base or heel area. While the fibrous materials are often bonded together, there may be little or no mechanical interconnection of the fibers themselves together in both lateral and radial directions within the reinforcement section. As the bonding material is worn away, the fibers are thus left with little support and become subject to extensive fraying. Another significant problem has been delamination in the heel section and at the transition between the heal and seal areas.

Thus, there has been a long-felt need in the industry to provide a more durable and economical reinforcement section for the lip seal assembly. Persons skilled in the art will appreciate the present invention, which substantially alleviates these and other problems associated with such sealing elements.

SUMMARY OF THE INVENTION

In a preferred embodiment, the present invention includes an annular body having an annular sealing section and an annular reinforcing section. The sealing section is formed from a resilient material and includes an annular lip seal. The reinforcing section is disposed distal the lip seal and forms an annularly extending radially facing surface of the sealing element. The reinforcing section thus serves to resist extrusion forces on said annular body in a direction generally parallel to the radially facing surface.

The reinforcing section comprises an annular portion less resilient than the lip seal. The reinforcing section includes at least one braided portion being comprised of a plurality of strands and is substantially elongate along a braid axis. The at least one braided portion has four corners with a substantially rectangular cross-section transverse to the braid axis. The four corners include a first pair of opposite corners and a second pair of opposite corners. A first corner strand extends axially along the braid axis and proceeds back and forth between the first pair of opposite corners. A second corner strand extends axially along the braid axis and proceeds back and forth between the second pair of opposite corners. At least one locking strand proceeds along the braid axis through and around each of the first and second corner strands for locking the first and second corner strands to the at least one braid portion. The reinforcing section is disposed distal the lip seal and forming an annularly extending radially facing surface of the sealing element. The reinforcing section serving to resist extrusion forces on the annular body in a direction generally parallel to the radially facing surface.

It is an object of the present invention to provide an improved anti-extrusion lip seal.

It is a further object of the present invention to provide a more durable lip seal having a flexible fibrous anti-extrusion section.

A feature of a preferred embodiment of the present invention is a braided interconnection between fibers forming a reinforcement section that interconnects both radially and laterally with respect to the sealing section while still remaining sufficiently flexible to act as an anti-extrusion element.

A further feature of a preferred embodiment of the present invention is an improved interconnection between the lip portion and reinforcement section.

An advantage of the present invention is an economical construction that is relatively simple and is largely waste free.

These and other objects, features, and advantages of the present invention will become apparent from the drawings, the descriptions given herein, and the appended claims.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE PREFERRED EMBODIMENTS

Figure 1:
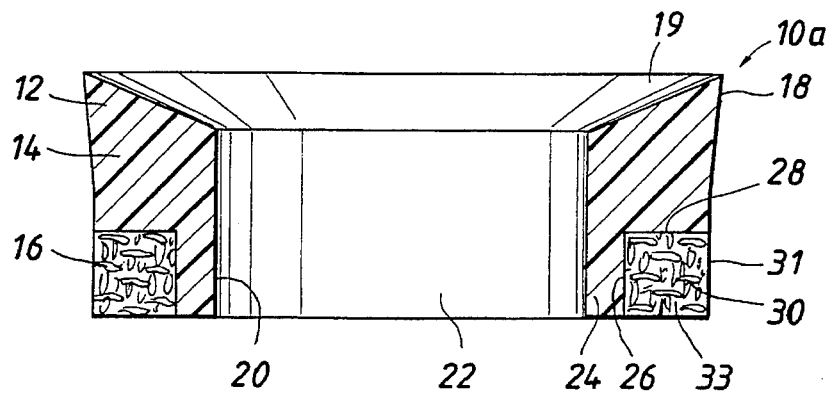
FIG. 1 is an elevational view, partially in section, showing an anti-extrusion lip seal in accord with the present invention.
Figure 2:
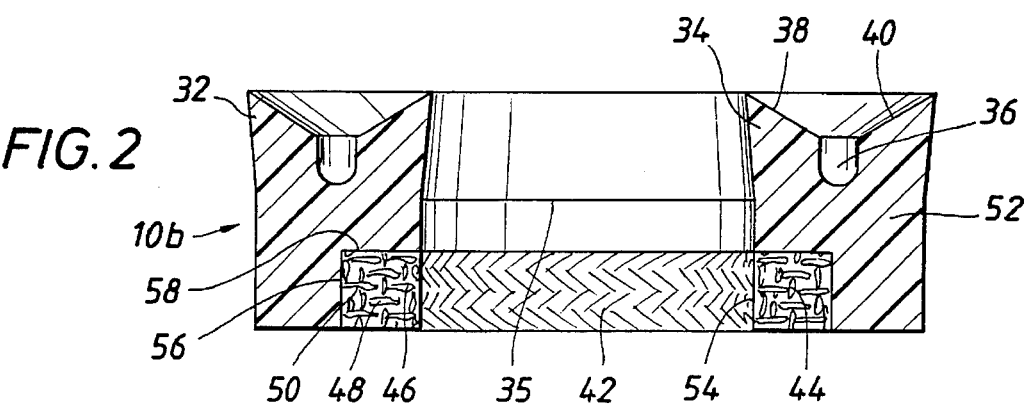
FIG. 2 is an elevational view, partially in section, of an anti-extrusion interior lip seal having an annular expansion groove.
Figure 3:
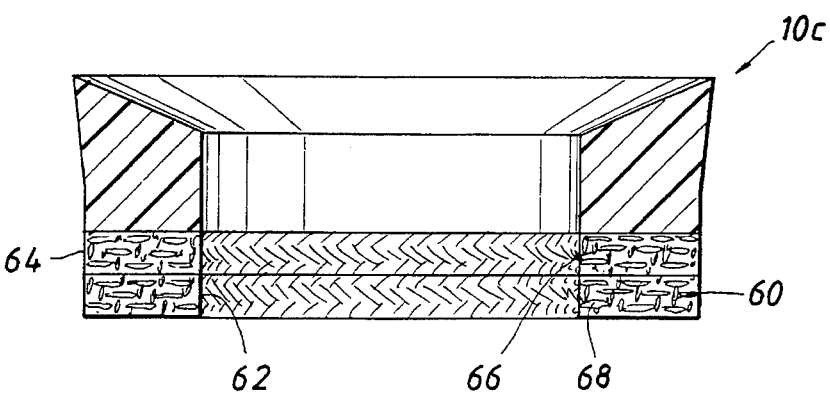
FIG. 3 is an elevational view, partially in section, of an anti-extrusion lip seal with laminated braided support sections.

With reference now to the drawings, and more particularly to FIGS. 1–3, there are schematically shown sealing devices, generally designated 10a–10c, illustrating several preferred embodiment anti-extrusion lip seals. The term "lip seal(s)" as used herein, in general, refers to any annularly extending sealing surface that forms the primary sealing surface of the seal. While, as shown in the accompanying drawings, the lip seals have feathered or tapered, annular lips that act as primary seals, it is to be understood that the actual shape of the sealing surface or lip can vary widely in shape and design. For example, the annular sealing surface or lip can be radiused, flat (frustoconical) or have what is commonly referred to as a reverse angle. In general, the lip portion of the lip seals will be that annular surface of the seal that exerts the primary sealing.

Sealing device 10a, shown in FIG. 1, basically includes exterior lip 12, body 14, and anti-extrusion element 16. Sealing device 10a, as well as other preferred embodiment sealing devices shown in FIGS. 2–3, are normally bonded together for unitized one-piece construction. However, in some instances, the anti-extrusion element such as element 16 may be a separate part and assembled with the body to complete the seal.

Exterior lip 12 and body 14 of sealing device 10a normally include elastomeric or resinous type materials such as, but not limited to, nitriles, neoprene, styrene-butadiene, fluoroelastomers, polyurethanes, or other similar materials. Combinations of these materials may be used and reinforcement materials including fiber materials may also be used as discussed hereinafter with respect to anti-extrusion elements such as anti-extrusion element 16. Lips and bodies of sealing devices 10b and 10c or other embodiments would also normally be comprised of these materials.

Exterior lip 12 extends annularly around sealing device 10a and includes radially outwardly feathering surface 18 that effects a seal with, for instance, the interior of a mud pump cylinder (not shown). Surface 19 extends radially outwardly and upwardly to further define exterior lip 12. Surface 19 is substantially cup-shaped and expands outwardly under pressure to co-operate with feathering surface 18 in forming a seal.

Body 14 is annularly disposed so that inner wall 20 defines a generally cylindrical bore 22 that extends through sealing device 10a. Body 14 includes inner annular segment 24 that forms surface 26 for mating with annular anti-extrusion element 16. The surface 26 allows increased bonding with anti-extrusion element 16 to reduce problems of separation between anti-extrusion element 16 and body 14. Surface 28 is also typically bonded with anti-extrusion element 16. The portion of sealing device 10a that includes anti-extrusion element 16, segment 24, and the bond with body 14 may be referred to as the heel portion of seal device 10a. Within the heel portion, the anti-extrusion element is typically arranged to support the lip seal. Thus, anti-extrusion element 16 is disposed radially outwardly with respect to body 14 to support exterior lip 12, which is also disposed radially outwardly with respect to body 14.

The resiliency of exterior lip 12 and body 14 augments sealing ability of sealing device 10a. However, there is a tendency, under high pressure, for portions of resilient lip 12 or body 14 to extrude outwardly so as to fold over or otherwise extend into a position where it may be pinched, torn or nipped off. Thus, sealing device 10a, and other sealing devices, may become damaged or simply lose some sealing ability due to the extrusion forces.

To counteract extrusion in sealing devices 10a–10c, it is desirable to have an annular anti-extrusion element comprised of material that has some resiliency but is less resilient than other elements such as body 14 or exterior lip 12. If the anti-extrusion element is completely non-resilient, then extrusion may occur past the element such as along radially facing surface 31 where it could be pinched or torn due to extrusion forces that are directed substantially parallel to radially facing surface 31. Rather, the anti-extrusion element should have sufficient resiliency to allow some movement of the sealing element but still be able to limit the extent of movement to avoid damage.

The anti-extrusion element of the present invention, such as anti-extrusion element 16, is of braided construction for additional strength. Braided construction is superior to laminated structures in that whereas laminated structures will separate, the braided construction will not separate. Besides being stronger than rolled or laminated structures, braided construction still maintains ample flexibility or resiliency to effectively operate as an anti-extrusion element. Furthermore, the tightness of the braid can be used to adjust the flexibility of the construction. Thus, the manufacturer can provide a very strong anti-extrusion element with exactly the flexibility desired. The braided construction can be reinforced with various materials or impregnated with binders, yarns and fillers such as strand 30. Strand 30 may be comprised of materials such as, but not limited to, nylon, polyester, aramid, cellulosic, acrylic, glass, carbon and the like that would be thermoplastic or thermoset in nature. Also, strand 30 or other strands or components in anti-extrusion element 16 may include metallic wire or supports. The anti-extrusion element, in most instances, would be impregnated with elastomeric or resinous binders between the strands such as at 33 or absorbed into the strands which is either thermoplastic or thermosetting in nature. An elastomeric, metal, or fibrous core may be used within the braided structure and one or more corners of the braid could be of a different material than the body of the braid.

Strand 30 is bound together in braided construction with other strands so that it is interconnected or braided in a radial direction, a lateral direction, and along a braid axis. A lateral direction is generally considered to be a direction substantially parallel to the axis of the sealing element (i.e. transverse to the braid axis). However, it will be understood that effectively the braid will be interconnected such that it is held together in three directions substantially orthogonal to provide three dimensional strength to the anti-extrusion elements even though the paths of the strands themselves, or the alignment of the interconnections between the strands, may not be in the purely lateral or radial direction. The actual direction of the lay or path of the strands may be offset from the radial, lateral, and axial directions as shown more clearly in FIGS. 6–12 that are discussed hereinafter. As well, the interconnections between the strands could be made in directions different from the purely lateral, radial, and axial while still providing a three dimensional structure that is bound together rather than a substantially laminated structure as taught by the prior art. However, generally the strand paths will be provided to run in at least three directions substantially orthogonal, or at least transverse, with respect to each other. The braided construction of the strands thus provides much greater strength in all directions than anti-extrusion elements, which may include only rolled strands or laminated layers of woven materials and supported only in one direction or that rely entirely for support on elastomeric or resinous binders.

While anti-extrusion element 16 has a substantially square cross-section, the cross-section may be oblong, rectangular, circular or other shapes depending largely on the application. Anti-extrusion element 16 is distal lip 12 with respect to body 14 and includes a radially facing surface 31.

Other aspects of an anti-extrusion lip seal devices in accord with the present invention may be seen in FIG. 2, which shows a sealing element having a double lip design that includes exterior lip 32 and interior lip 34. Double lip seals may be used for dynamically sealing piston rods, plungers, and other reciprocating bodies that may extend through bore 35. Seal device 10b includes two cup surfaces 38 and 40 that expand under pressure to enhance sealing. Annular groove 36 provides additional flexibility that, under pressure, augments sealing of seal device 10b.

The braided construction of the anti-extrusion element 44 may be characterized by a diamond pattern 42 that extends the length of the elongate braided material. The square cross-section of anti-extrusion element 44 shows an interlocking braided construction. While the interlocking braided construction would normally be preferred, it is understood that other braided constructions may be used for certain applications. The braided anti-extrusion element is comprised of a plurality of separate strands, such as strands 46, 48, and 50, which are disposed in multiple-turn serpentine fashion to form a very sturdy, yet flexible, braided construction. Each strand may turn outwardly for a short length to collectively form radially facing surface 54. Each strand then turns inwardly into the body of anti-extrusion element 44 before it reappears on the surface at another position in the braid. While braiding typically requires at least three strands, it will be apparent that in the braided anti-extrusion elements of the present invention generally more than three strands are employed, the number of strands employed being dependent upon the size of the anti-extrusion element, the type of braid, etc. The same strands, if desired for manufacturing purposes, may extend throughout the length of elongate anti-extrusion element 44. In sealing element 10b, anti-extrusion section 44 is disposed inwardly with respect to body 52 to provide extrusion support for interior lip 34. Thus, anti-extrusion element 44 will be used to prevent extrusion of resilient material from lip 34 and body 52 into bore 35. Body walls 56 and 58 provide ample bonding surface if it is desired to bond anti-extrusion element 44 to body 52.

Figure 4:
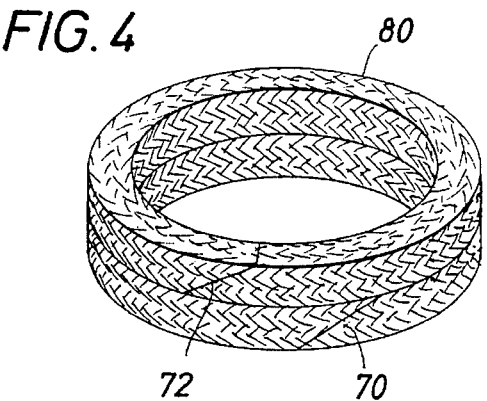
FIG. 4 is an elevational view, partially in section, of interlocking braided support section configuration.
Figure 5:
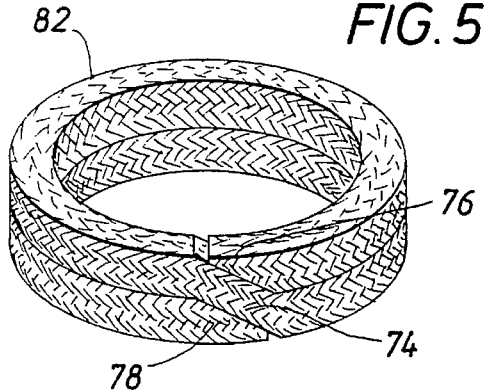
FIG. 5 is an elevation view, partially in section, of an alternative interlocking braided support section configuration.

In FIG. 3, anti-extrusion element 60 covers the entire heel portion of sealing device 10c. Thus, anti-extrusion element 60 has two radially facing surfaces 62 and 64 disposed on the respective interior and exterior of sealing device 10c. Surface 62 faces radially inwardly and surface 64 faces radially outwardly. Anti-extrusion element 60 may include two separate layers 66 and 68 that are bonded to each other. Since there are only a few layers, in this case two layers, the chance of separation is greatly reduced as compared to anti-extrusion elements, which may include many thin layers or rolls. A layered anti-extrusion element, such as element 60, may be of multiple or one-piece construction as shown in FIG. 4 and FIG. 5, respectively. Thus, the braided annular anti-extrusion elements 80 and 82 may have two or more layers or laminations or layers. Bevelled ends 70 and 72 are preferably used to interconnect opposing end sections of anti-extrusion element 80 together. FIG. 5 discloses an anti-extrusion section of two layers obtained by winding a single element, a portion forming a crossover 74 between the two layers, bevelled edges 76 and 78 abutting crossover 74. The long bevelled portion allows greater surface area for bonding but square cut ends may also abut together to form the annular anti-extrusion element.

Figure 6:
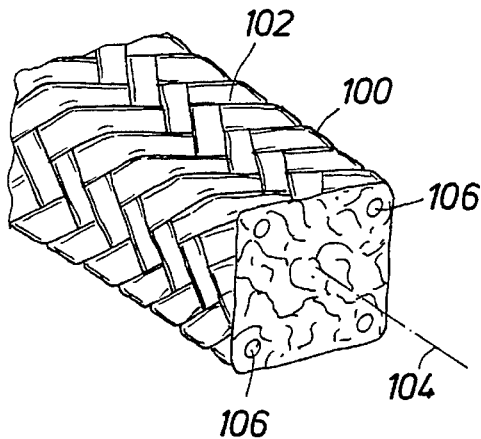
FIG. 6 is a perspective view of an elongate braided section with a single diamond back pattern in accord with the present invention.
Figure 7:
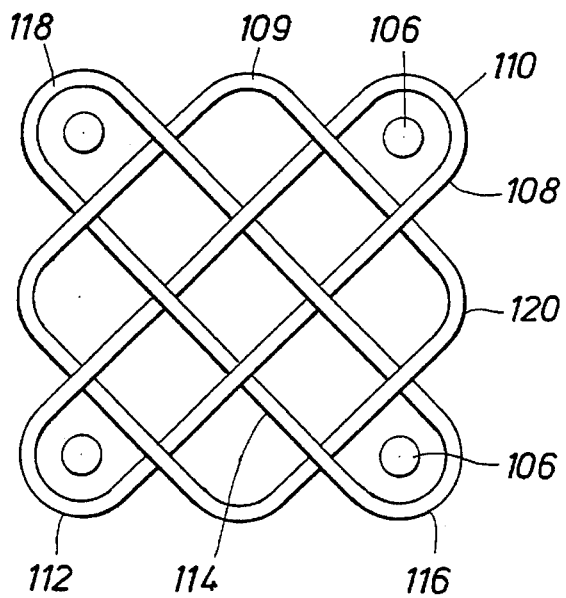
FIG. 7 is a cross-sectional schematic view of the single diamond back pattern braiding of FIG. 6 showing the braiding paths of the two corner strands and the single braiding path of interlocking strands.

FIG. 6 discloses an expanded view of interlocking braided anti-extrusion element 100 having single diamond back pattern 102 and extending along braid axis 104. The interlocking braided pattern is best explained with reference to FIG. 7 that shows the braiding path of the main strands of anti-extrusion element 100. It will be understood that many filler elements, such as axially running corner fillers 106, may be used within the braided anti-extrusion element 100 for shaping and providing the desired braid density, and so forth. First corner-to-corner braid path 108 runs back and forth between opposite corners 110 and 112. Second corner-to-corner braid path 114 goes between the remaining pair of opposite corners 116 and 118. A single interlocking braid path 120 is shown in FIG. 7 that goes through and around each of the first and second braid paths 108 and 114, respectively. That is, adjacent one corner, for instance corner 110, interlocking path 120 goes under first braid path 108, through braid path 108, and around first braid path 108 to approximate midsection 109 of braided element 100. Adjacent the next corner 118, interlocking path goes over second braid path 116, through it, and then over braid path 116. The interlocking strands are used to lock the corner strands to the braided anti-extrusion element.

Figure 10:
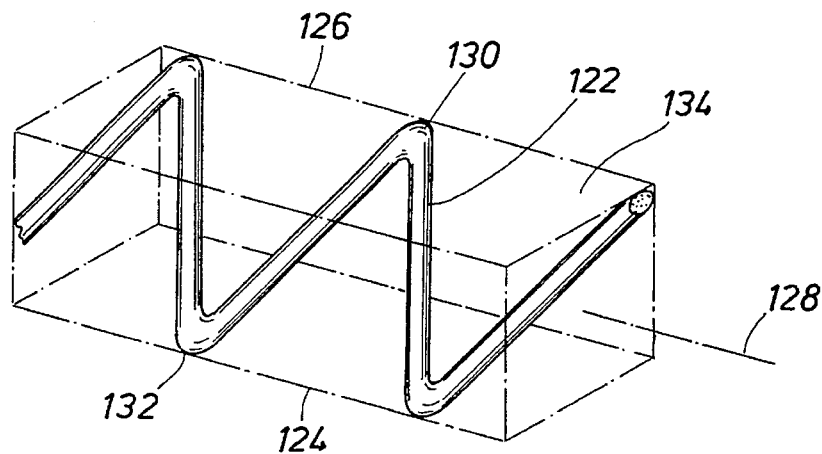
FIG. 10 is a perspective view showing an outline of an elongate square braided section with the path of a single corner-to-corner strand therethrough.
Figure 11:
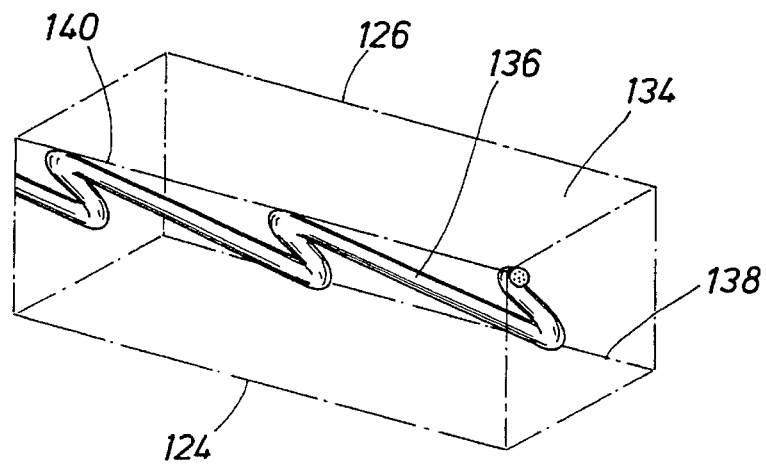
FIG. 11 is a perspective view showing an outline of an elongate square braided section with the path of a single corner-to-corner strand therethrough traveling to opposite corners with respect to the corner-to-corner strand of FIG. 10.
Figure 12:
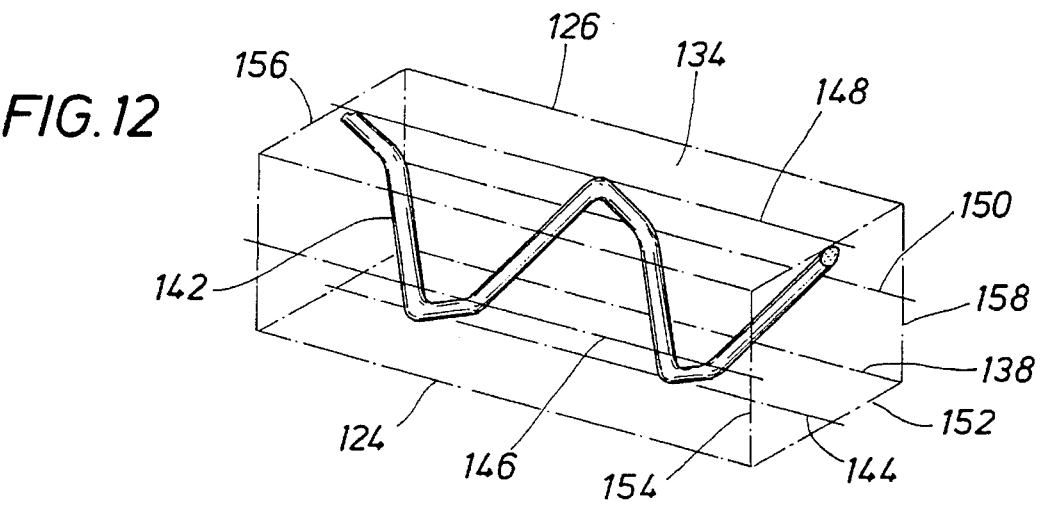
FIG. 12 is a perspective view showing an outline of an elongate square braided section with the path of a single interlocking strand therethrough.

An example of the individual strands that follow the braiding paths 108, 116, and 120 is shown in FIGS. 10–12. FIG. 10 shows corner-to-corner strand 122 that proceeds back and forth between a first pair of opposite corners 124 and 126. Only one strand 122 is shown for clarity in understanding the interlocking braided pattern of the present invention. However, it will be understood that multiple corner strands follow this corner-to-corner path with each strand being offset axially with respect to each other. The shape of the strand, seen from the side, is substantially sinusoidal as it goes back and forth between the respective corners along braid axis 128. The peaks and valleys 130 and 132 of strand 122 go to the respective corners of the braided anti-extrusion element 134.

With reference to FIG. 11, strand 136 goes back and forth between the remaining pair of opposite corners, 138 and 140

(i.e. corner 138 and 140 are opposite each other rather than adjacent each other). Again, it will be understood that strand 136 is but one of the multiple strands, each axially offset with respect to each other along braid axis 128, that go back and forth between corners 138 and 140.

FIG. 12 discloses the path, seen from a perspective view, of interlocking strand 142. As also indicated in FIG. 7, interlocking strand 142 goes substantially to each respective midpoints 144, 146, 148, and 150 of respective sides 152, 154, 156, and 158. As can be seen in the various figures, the cross-section of anti-extrusion elements, such as elements 100 or 136, is substantially rectangular or in a presently preferred embodiment, substantially square.

Figure 8:
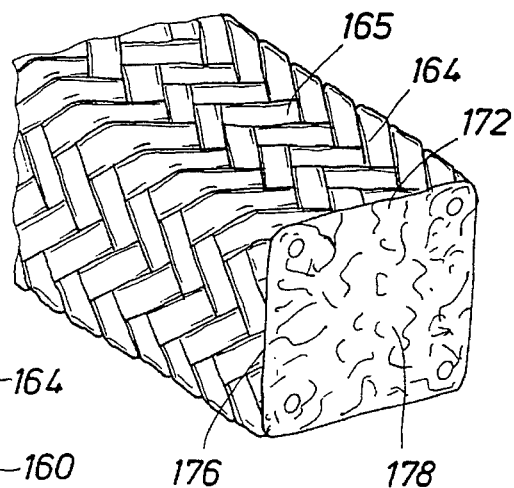
FIG. 8 is a perspective view of an elongate braided section with a double diamond back pattern in accord with the present invention.
Figure 9:
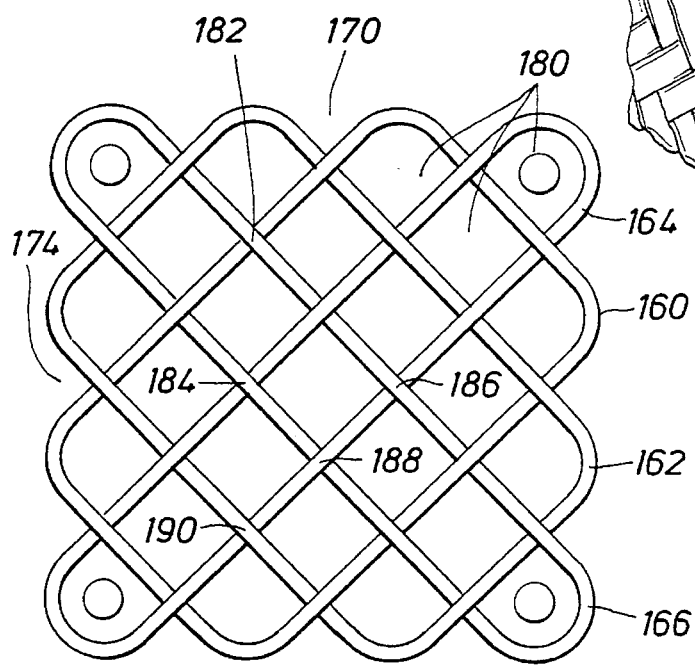
FIG. 9 is a cross-sectional schematic view of the double diamond back pattern braiding of FIG. 6 showing the braiding paths of the two corner strands and two braiding paths of interlocking strands.

FIGS. 8 and 9 disclose an interlocking braided anti-extrusion element that includes two interlocking strand paths 160 and 162 that result in two diamond paths 164 and 165 that travel along the elongate braided anti-extrusion element 178. As can be seen, this pattern provides interlocking strands that interlock with each other and with corner-to-corner strands in paths 164 and 166. Thus, interlocking strand path 160 proceeds over and under corner-to-corner strand path 164 (and the corresponding strands therein), intercepts the approximate midsection region 170 of side 172, goes over interlocking strand path 162, under and over corner-to-corner strand path 166, under interlocking strand path 162 to engage the approximate midsection region 174 of side 176, and continues in this pattern around the braided anti-extrusion element 178. It will be understood that multiple strands, axially offset from each other, follow this path within element 178. The second interlocking strand path 162 follows the same pattern as shown.

Generally, the braided anti-extrusion elements, in a preferred embodiment, have a square or rectangular cross-section having a minimum thickness of 30 percent of the width although a somewhat smaller thickness is also possible. Clearly the width of the braided element cross-section will be greater than the thickness of two strands, which would be the approximate width of a flat braid or woven structure. The width and height of the cross-section will therefore typically be at least several times the thickness of an individual strand. Each strand may be comprised of several threads or filaments. Various filler strands, which may run substantially axially rather back and forth, may be between any openings such as openings 180 of FIG. 9. It will also be noted that the interconnections between the strands, as compared to the strands themselves, proceed substantially axially along the length of the braid. That is to say that interconnections at the point 182 in the strand path will form a substantially linear array of strand interconnections substantially parallel with the braid axis. Furthermore, in the cross-section or plane transverse to the braid axis, the interconnections form substantially linear arrays in several directions transverse to the braid axis. For instance, points 182, 184, and 190 form a linear array of interconnections transverse to the braid axis. Similarly, points 186, 188, and 190 form a linear array of interconnections transverse to the braid axis.

The foregoing disclosure and description of the invention is illustrative and explanatory thereof, and it will be appreciated by those skilled in the art, that various changes in the size, shape and materials as well as in the details of the illustrated construction or combinations of features of the various valve elements may be made without departing from the spirit of the invention.

What is claimed is:

1. An annular sealing element comprising:

an annular body having an annular sealing section and an annular reinforcing section;

said sealing section comprising a resilient material and including an annular lip seal; and said reinforcing section comprising an annular portion less resilient than said lip seal, said reinforcing section including at least one braided portion being comprised of a plurality of strands and being substantially elongate along a braid axis, said at least one braided portion having four corners with a substantially rectangular cross-section transverse to said braid axis, said four corners including a first pair of opposite corners and a second pair of opposite corners, a first corner strand extending axially along said braid axis and proceeding back and forth between said first pair of opposite corners, and a second corner strand extending axially along said braid axis and proceeding back and forth between said second pair of opposite corners, at least one locking strand proceeding along said braid axis through and around each of said first and second corner strands for locking said first and second corner strands to said at least one braid portion, said reinforcing section being disposed distal said lip seal and forming an annularly extending radially facing surface of said sealing element, said reinforcing section serving to resist extrusion forces on said annular body in a direction generally parallel to said radially facing surface.

2. The sealing dement of claim 1 wherein said substantially rectangular cross-section has a width and a height such that both said width and height are each several times greater than the average thickness of each of said plurality of strands.

3. The sealing element of claim 1 wherein said reinforcing section is bonded to said body portion.

4. The sealing element of claim 1 wherein said reinforcing section is generally square in cross-section.

5. The sealing element of claim 1 wherein said reinforcing section defines a heel portion of said body, said heal portion being distal said sealing lip, said heel portion forming a radially outwardly facing surface, and a radially inwardly facing surface.

6. The sealing element of claim 1 wherein said reinforcing section is comprised of a plurality of separate, braided portions, said separate braided portions being bonded to one another.

7. The sealing element of claim 6 wherein said reinforcing section is bonded to said body.

8. The sealing element of claim 1 wherein said body is comprised of a generally resilient material.

9. The sealing element of claim 1 wherein said reinforcing section is comprised of multiple layers of a single braided portion, said single braided portion being wound to form said multiple layers.

\* \* \* \* \*

UNITED STATES PATENT AND TRADEMARK OFFICE
CERTIFICATE OF CORRECTION

PATENT NO. : 5,499,826
DATED : March 19, 1996
INVENTOR(S) : Aaron J. Pippert and Frederick B. Pippert It is certified that error appears in the above-indentified patent and that said Letters Patent is hereby corrected as shown below:

In column 8, line 34, delete "dement" and insert therefor --element--.

Signed and Sealed this

Thirteenth Day of August, 1996

*Attest:*

BRUCE LEHMAN

*Attesting Officer*    Commissioner of Patents and Trademarks